United States Patent [19]

Simonet et al.

[11] Patent Number: 4,512,778
[45] Date of Patent: Apr. 23, 1985

[54] ADSORPTION PROCESSES

[75] Inventors: Guy Simonet; Léon Hay, both of Paris, France

[73] Assignee: L'Air Liquide, Societe Anonyme pour l'Etude l'Exploitation des Procedes Georges Claude, Paris, France

[21] Appl. No.: 541,082

[22] Filed: Oct. 12, 1983

[30] Foreign Application Priority Data

Oct. 22, 1982 [FR] France ............................. 82 17676

[51] Int. Cl.$^3$ ............................................ B01D 53/04
[52] U.S. Cl. .......................................... 55/26; 55/62; 55/68; 55/74
[58] Field of Search .................. 55/25, 26, 58, 62, 68, 55/74, 75

[56] References Cited

U.S. PATENT DOCUMENTS

| 3,788,036 | 1/1974 | Lee et al. ............................. 55/62 X |
| 3,977,845 | 8/1976 | Walter ..................................... 55/25 |
| 3,986,849 | 10/1976 | Fuderer et al. ......................... 55/25 |
| 4,021,210 | 5/1977 | Streich et al. ........................... 55/26 |
| 4,077,780 | 3/1978 | Doshi ..................................... 55/26 |
| 4,160,651 | 7/1979 | Pivard .................................... 55/26 |
| 4,194,890 | 3/1980 | McCombs et al. .................. 55/25 X |
| 4,340,398 | 7/1982 | Doshi et al. ............................. 55/25 |
| 4,350,500 | 9/1982 | Esselink ................................. 55/26 |
| 4,381,189 | 4/1983 | Fuderer ................................... 55/26 |
| 4,402,712 | 9/1983 | Benkmann ............................. 55/26 |

FOREIGN PATENT DOCUMENTS

| 022603 | 1/1981 | European Pat. Off. . |
| 2193643 | 2/1974 | France . |
| 2294741 | 7/1976 | France . |

Primary Examiner—Robert Spitzer
Attorney, Agent, or Firm—Lee C. Robinson, Jr.

[57] ABSTRACT

The gas originating from the expansion during the stage ($T_6$) is directed into a buffer tank and each adsorber has an operating cycle delayed by 1/nth of the cycle period (T) with respect to a preceding one, and each production stage has a duration of $(x/n)T$, "n" being greater than or equal to 6, and "x" greater than or equal to 2, and each expansion stage at an intermediate pressure has a shorter duration than each elution stage.

7 Claims, 6 Drawing Figures

FIG.6

ADSORPTION PROCESSES

BACKGROUND OF THE INVENTION

The present invention relates to an adsorption process utilising a plurality of adsorbers, with the following successive operating stages: a so-called high-pressure isobaric production in equidirectional flow over several adsorbers at the same time; at least one expansion in equidirectional flow by balancing with another adsorber undergoing recompression in counterflow; expansion at intermediate pressure in equidirectional flow; final expansion to so-called low pressure in counterflow; elution at the said low pressure in counterflow; recompression in counterflow by means of at least one balancing operation; final recompression in counterflow by derivation of a part of the production flow.

SUMMARY OF THE INVENTION

It is an object of the invention to provide new developments of the process hereinabove set forth and is characterised in that the gas coming from the said expansion at intermediate pressure is fed into a buffer tank, whereas the elution gas is drawn from the said buffer tank, in that each adsorber has an operating cycle delayed by 1/nth of a cycle period (T) with respect to a preceding one (n being the number of adsorbers), and in that each production stage has a duration of $(x/n)T$ ($x$ being the number of adsorbers in simultaneous production), with "n" being greater than or equal to 6, and "x" being greater than or equal to 2, and in that each stage of expansion to intermediate pressure has a shorter duration than each elution stage.

The ratio between the duration of an elution stage and the duration of a stage of expansion to intermediate pressure is preferably equal to at least 1.5 and preferentially equal to 2 or 3. According to one mode of application, the number n of adsorbers is one of the numerals six and seven, and comprises a single expansion with balancing action. According to another mode of application, the number n of adsorbers is one of the numerals seven, eight and nine, and comprises two successive expansions by balancing actions occurring first with an adsorber which had already undergone a first balancing action, and then with another adsorber at the end of an elution stage. According to another mode of application, the number "n" of adsorbers is nine and comprises three successive expansions by balancing action, with three other adsorbers.

BRIEF DESCRIPTION OF THE DRAWINGS

In order that the invention will be more clearly understood, reference will now be made to the accompanying drawings which show explanatory graphs and a diagrammatic representation of one embodiment of the invention by way of example, and in which:

FIG. 6 is a diagrammatical view given by way of example, of an embodiment operating in accordance with the graph of FIG. 4.

DETAILED DESCRIPTION OF THE PREFERRED EMBODIMENT

Figure 1:
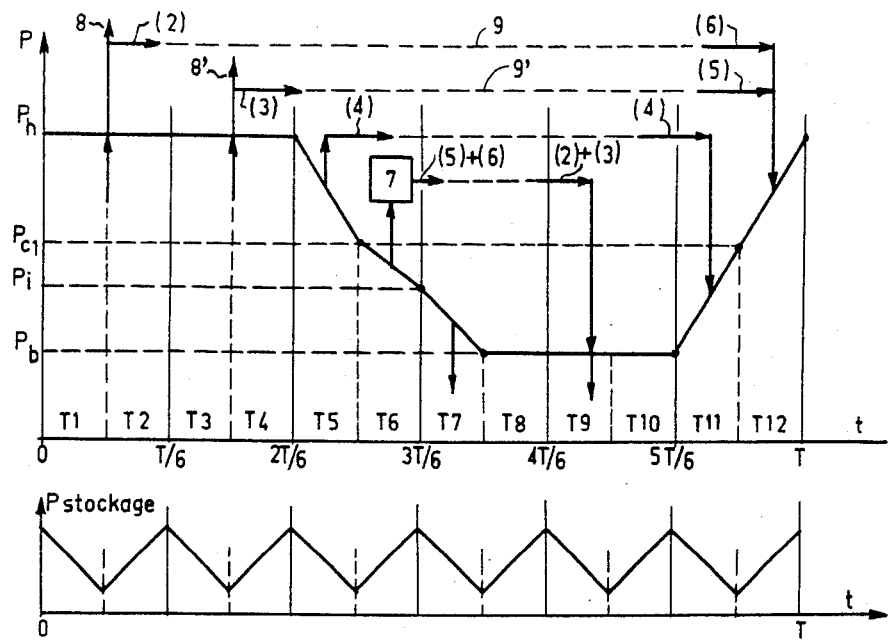
FIG. 1 is a graph illustrating the pressures as ordinates as a function of the time plotted as abscissae for an adsorber, on which the pressure variations of the storage tank are also shown, but below.

With reference to the graph of FIG. 1, an illustration has been provided for a group of six adsorbers numbers 1, 2, 3, 4, 5 and 6 cooperating with a storage tank shown at 7, the pressure variation P for the adsorber 1 throughout the period of an operating cycle established between the time O and the time T and this period T has been subdivided into twelve sub-periods marked $T_1$ to $T_{11}$ and $T_{12}$; it should be understood that all the adsorbers have the same operating stages as that shown in the graph for the adsorber 1, with a time lag of T/6 between one adsorber and the next.

Let it also be understood that the arrowed directional lines denote the movements and destinations of the gas flows; if the arrows are parallel to the ordinate, they indicate the direction of flow in an adsorber, moreover; if an arrow extends in the direction of the increasing ordinates (towards the top of a graph), the flow is referred to as an equidirectional flow in an adsorber; if the upwardly directed arrow is situated below the line denoting the pressure in the adsorber, the flow penetrates into the adsorber through the inlet end of the adsorber; if the upwardly directed arrow is situated above the line denoting the pressure, the flow emerges from the adsorber via the outlet end of the adsorber, the inlet and outlet ends respectively being those of the gas which is to be processed and of the gas drawn into an isobaric production stage; if an arrow extends in the direction of the decreasing ordinates (towards the bottom of the graph) the flow is referred to as a counterflow, in an adsorber. If the downwardly directed arrow is situated below the line denoting the pressure in the adsorber, the flow emerges from the adsorber through the inlet end of the adsorber; if the downwardly directed arrow is situated above the line denoting the pressure, the flow penetrates into the adsorber through the outlet end of the adsorber, the inlet and outlet ends still being those, respectively, for the gas to be processed and for the gas drawn off in an isobaric production stage. On the other hand, unbroken thick lines have been used to denote the gas flows applicable to the adsorber 1 alone, and thick but dotted lines have been used to denote the gas flows coming from or going to other adsorbers or the buffer tank.

Consequently, for the adsorber 1, the production stage 8 and 8' at high pressure $P_h$ lasts from 0 to 2T/6 (sub-periods $T_1+T_2+T_3+T_4$); during a terminal part of the production stage 8, and more particularly during the sub-period $T_2$, a derivation gas flow 9 is drawn off for the purpose of being directed in counterflow into the adsorber 2 to provide the final recompression of this latter; during a terminal part of the production stage 8', and more particularly during the sub-period $T_4$, a derivation gas flow 9' is drawn off for the purpose of being directed in counterflow into the adsorber 3. The first decompression of the adsorber 1 occurs during the sub-period $T_5$ by balancing with the adsorber 4 (decompression in equidirectional flow of the adsorber 1 and recompression in contradirectional flow of the adsorber 4). The second decompression in equidirectional flow occurs during the sub-period $T_6$, and the gas is discharged to the storage tank 7 for elution of the adsorber 5 and then the adsorber 6. The third decompression in contradirectional flow occurs during the sub-period $T_7$ with discharge to the atmosphere. The elution stage of the adsorber 1 is performed with gas coming from the storage tank 7 supplied from the adsorber 2, and then the adsorber 3, during their second decompression stages and occurs during the sub-periods $T_8$, $T_9$, $T_{10}$, the elution gas flow in contradirectional flow into the adsorber 1. The first recompression in contradirectional flow by balancing with the adsorber 4 during a first decompression stage occurs during the sub-period $T_{11}$ and the pressure $P_{CI}$ corresponding to the first decompression of the sub-period $T_5$ then prevails again. The final recompression of the adsorber 1 occurs during the sub-period $T_{12}$ due to drawing on the production gas flow, from the adsorbers 5 and 6. The other adsorbers 2, 3, 4, 5 and 6 evidently and strictly provide the same operational modes as those which have been described with reference to the adsorber 1, but with a time lag of T/6, and the operational modes of the different adsorbers 1 to 6 during the sub-periods from $T_1$ to $T_{12}$ have been collated below as a function of the "production", "first decompression", "second decompression towards the tank 7" (into storage), "third decompression" or "final decompression", "elution", then "first recompression" and "final recompression" stages.

period $T_2,T_4,T_6,T_8,T_{10},T_{12}$, this withdrawal affects two adsorbers on the contrary, so that as apparent from FIG. 1, the pressure of the storage tank drops during these first odd-numbered sub-periods, whereas it raises during the second even-numbered sub-periods due to the flow directed into the storage section during these same second sub-periods. The first recompression occurs during the odd-numbered sub-periods, whereas the recompression occurs during the even-numbered sub-periods. It will evidently be noted that the gas flow coming from the first decompression of the adsorbers 5,6,1,2,3,4 is used to perform the first recompression, of the adsorbers 2,3,4,5,6,1 respectively, until the pressure balance has been established between each of the pairs of adsorbers in question.

Figure 2:
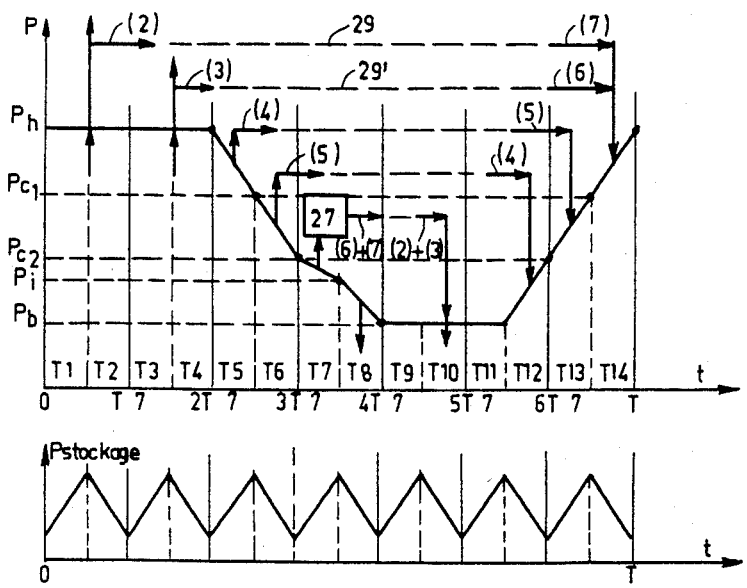
FIGS. 2 to 5 are graphs showing four modified modes of application of the invention.

Reference will now be made to FIG. 2, in which the pressure variation of an adsorber of a group of seven adsorbers having a storage section 27, has been shown. The production stage lasts from the time 0 to 2T/7 (sub-period $T_1,T_2,T_3,T_4$); the first decompression stage occurs during the sub-period $T_5$ whereas the second decompression by a second balancing action occurs

TABLE I

|  | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ |
|---|---|---|---|---|---|---|---|---|---|---|---|---|
| Production | 6 + 1 | 6 + 1 | 1 + 2 | 1 + 2 | 2 + 3 | 2 + 3 | 3 + 4 | 3 + 4 | 4 + 5 | 4 + 5 | 5 + 6 | 5 + 6 |
| 1st decompression (balancing) | 5 |  | 6 |  | 1 |  | 2 |  | 3 |  | 4 |  |
| Into Storage |  | 5 |  | 6 |  | 1 |  | 2 |  | 3 |  | 4 |
| Final decompression | 4 |  | 5 |  | 6 |  | 1 |  | 2 |  | 3 |  |
| Elution | 3 | 3 + 4 | 4 | 4 + 5 | 5 | 5 + 6 | 6 | 6 + 1 | 1 | 1 + 2 | 2 | 2 + 3 |
| 1st recompression (balancing) | 2 |  | 3 |  | 4 |  | 5 |  | 6 |  | 1 |  |
| Final recompression |  | 2 |  | 3 |  | 4 |  | 5 |  | 6 |  | 1 |

Referring to the Table I on the preceding page, it is apparent for example that two adsorbers are constantly in the production stage, which is the required purpose. Regarding the two stages chronologically staggered with respect to each other by a period T/6, it is apparent that they recur in analogous manner with each first decompression stage by balancing during the sub-periods $T_1,T_3,T_5,T_7,T_9,T_{11}$, followed by a second decompression towards the storage section during the sub-periods $T_2,T_4,T_6,T_8,T_{10},T_{12}$, finally followed by a final decompression during the sub-periods $T_1,T_3,T_5,T_7,T_9,T_{11}$. Elution by drawing from storage is performed permanently, during a first sub-period $T_1,T_3,T_5,T_7,T_9,T_{11}$, this withdrawal affects one adsorber only whereas during the following second subduring the sub-period $T_6$. The stage of decompression towards the storage section 27 occurs during the sub-period $T_7$, whereas the final decompression stage occurs during the sub-period $T_8$; the elution stage occurs during the sub-periods $T_9,T_{10},T_{11}$. The first recompression stage occurs during the sub-period $T_{12}$. The second recompression stage by balancing action occurs during the sub-period 13 and the final recompression stage by drawing a gas flow 29 from the production flow, occurs during the sub-period T/14. As previously, hereinafter follows Table II collated to show the different adsorbers affected by the different production stages as a function of the different sub-periods $T_1$ to $T_{14}$. A perusal of this table also discloses the different operating stages.

TABLE II

|  | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ | $T_{13}$ | $T_{14}$ |
|---|---|---|---|---|---|---|---|---|---|---|---|---|---|---|
| Production | 7 + 1 | 7 + 1 | 1 + 2 | 1 + 2 | 2 + 3 | 2 + 3 | 3 + 4 | 3 + 4 | 4 + 5 | 4 + 5 | 5 + 6 | 5 + 6 | 6 + 7 | 6 + 7 |
| 1st decompression (balancing) | 6 |  | 7 |  | 1 |  | 2 |  | 3 |  | 4 |  | 5 |  |
| 2nd decompression (balancing) |  | 6 |  | 7 |  | 1 |  | 2 |  | 3 |  | 4 |  | 5 |
| Into Storage | 5 |  | 6 |  | 7 |  | 1 |  | 2 |  | 3 |  | 4 |  |
| Final Decompression |  | 5 |  | 6 |  | 7 |  | 1 |  | 2 |  | 3 |  | 4 |
| Elution | 3 + 4 | 4 | 4 + 5 | 5 | 5 + 6 | 6 | 6 + 7 | 7 | 7 + 1 | 1 | 1 + 2 | 2 | 2 + 3 | 3 |
| 1st recompression (balancing) |  | 3 |  | 4 |  | 5 |  | 6 |  | 7 |  | 1 |  | 2 |
| 2nd recompression (balancing) | 2 |  | 3 |  | 4 |  | 5 |  | 6 |  | 7 |  | 1 |  |
| Final Recompression |  | 2 |  | 3 |  | 4 |  | 5 |  | 6 |  | 7 |  | 1 |

Figure 3:
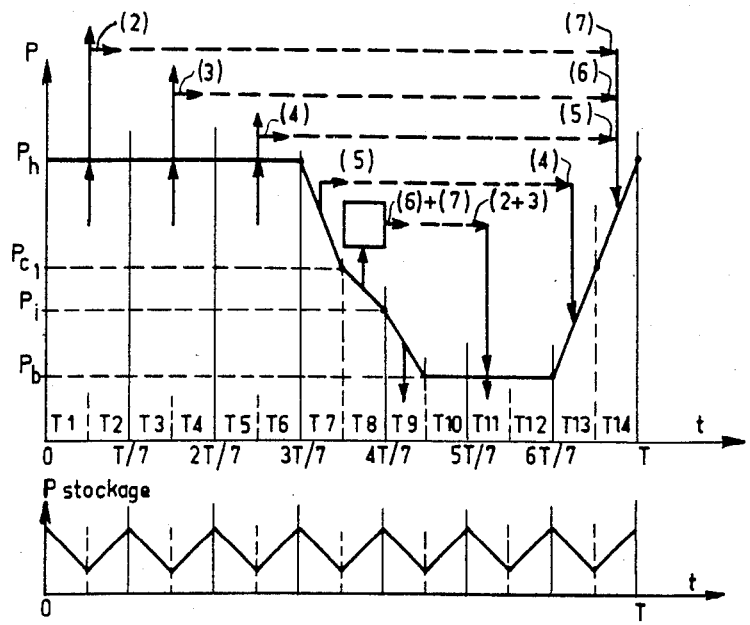

FIG. 3 illustrates a graph relating to seven adsorbers with a storage section, but in this case, there are three adsorbers in simultaneous production and a single balancing action. The different operating stages, with the numbers of the adsorbers in question, have also been plotted below as a function of the sub-periods $T_1$ to $T_{14}$ in Table III.

the adsorbers affected by the different operating stages have also been collated in the following Table IV as a function of the sub-periods $T_1$ to $T_{16}$.

TABLE IV

|  | $T_1$ | $T_2$ | $T_3$ | $T_4$ | $T_5$ | $T_6$ | $T_7$ | $T_8$ |
|---|---|---|---|---|---|---|---|---|
| Production | 781 | 781 | 812 | 812 | 123 | 123 | 234 | 234 |
| 1st decompression (balancing) | 6 |  | 7 |  | 8 |  | 1 |  |
| 2nd decompression (balancing) |  | 6 |  | 7 |  | 8 |  | 1 |
| Into Storage | 5 |  | 6 |  | 7 |  | 8 |  |
| Final decompression |  | 5 |  | 6 |  | 7 |  | 8 |
| Elution | 3 + 4 | 4 | 4 + 5 | 5 | 5 + 6 | 6 | 6 + 7 | 7 |
| 1st recompression (balancing) |  | 3 |  | 4 |  | 5 |  | 6 |
| 2nd recompression (balancing) | 2 |  | 3 |  | 4 |  | 5 |  |
| Final Recompression |  | 2 |  | 3 |  | 4 |  | 5 |

|  | $T_9$ | $T_{10}$ | $T_{11}$ | $T_{12}$ | $T_{13}$ | $T_{14}$ | $T_{15}$ | $T_{16}$ |
|---|---|---|---|---|---|---|---|---|
| Production | 345 | 345 | 456 | 456 | 567 | 567 | 678 | 678 |
| 1st decompression (balancing) | 2 |  | 3 |  | 4 |  | 5 |  |
| 2nd decompression (balancing) |  | 2 |  | 3 |  | 4 |  | 5 |
| Into Storage | 1 |  | 2 |  | 3 |  | 4 |  |
| Final decompression |  | 1 |  | 2 |  | 3 |  | 4 |
| Elution | 7 + 8 | 8 | 8 + 1 | 1 | 1 + 2 | 2 | 2 + 3 | 3 |
| 1st recompression (balancing) |  | 7 |  | 8 |  | 1 |  | 2 |
| 2nd recompression (balancing) | 6 |  | 7 |  | 8 |  | 1 |  |
| Final Recompression |  | 6 |  | 7 |  | 8 |  | 1 |

Figure 5:
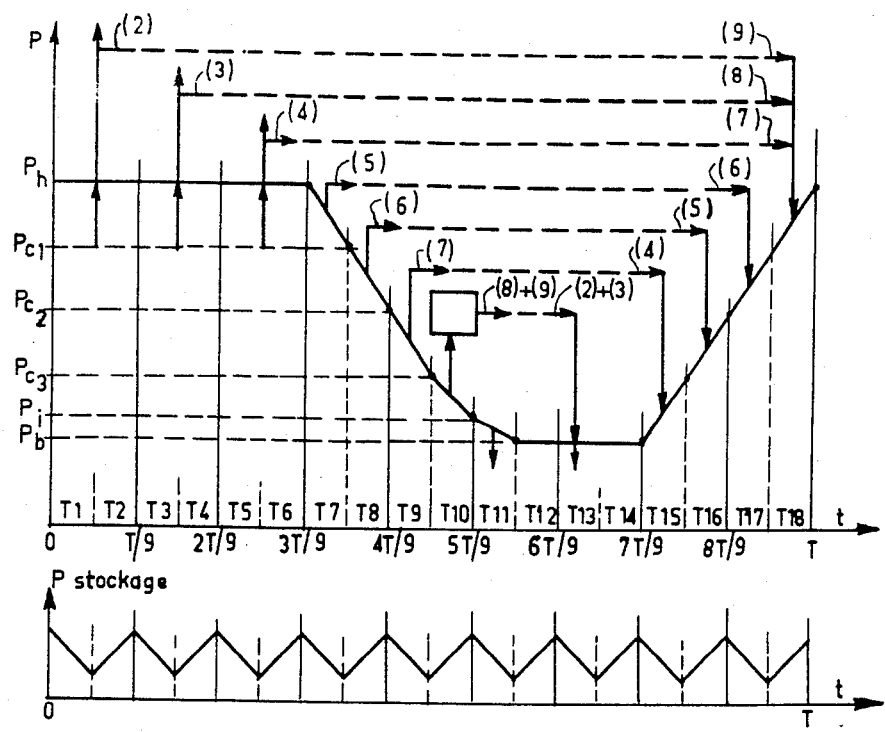

In the case of FIG. 5, this has as its object a group of nine adsorbers having a single storage section and three adsorbers in simultaneous production and three successive balancing actions. The same table as before, show-

TABLE III

|  | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ | $T_{13}$ | $T_{14}$ |
|---|---|---|---|---|---|---|---|---|---|---|---|---|---|---|
| Production | 671 | 671 | 712 | 712 | 123 | 123 | 234 | 234 | 345 | 345 | 456 | 456 | 567 | 567 |
| 1st decompression (balancing) | 5 |  | 6 |  | 7 |  | 1 |  | 2 |  | 3 |  | 4 |  |
| Into Storage |  | 5 |  | 6 |  | 7 |  | 1 |  | 2 |  | 3 |  | 4 |
| Final Decompression | 4 |  | 5 |  | 6 |  | 7 |  | 1 |  | 2 |  | 3 |  |
| Elution | 3 | 3 + 4 | 4 | 4 + 5 | 5 | 5 + 6 | 6 | 6 + 7 | 7 | 7 + 1 | 1 | 1 + 2 | 2 | 2 + 3 |
| 1st recompression (balancing) | 2 |  | 3 |  | 4 |  | 5 |  | 6 |  | 7 |  | 1 |  |
| Final Recompression |  | 2 |  | 3 |  | 4 |  | 5 |  | 6 |  | 7 |  | 1 |

Figure 4:
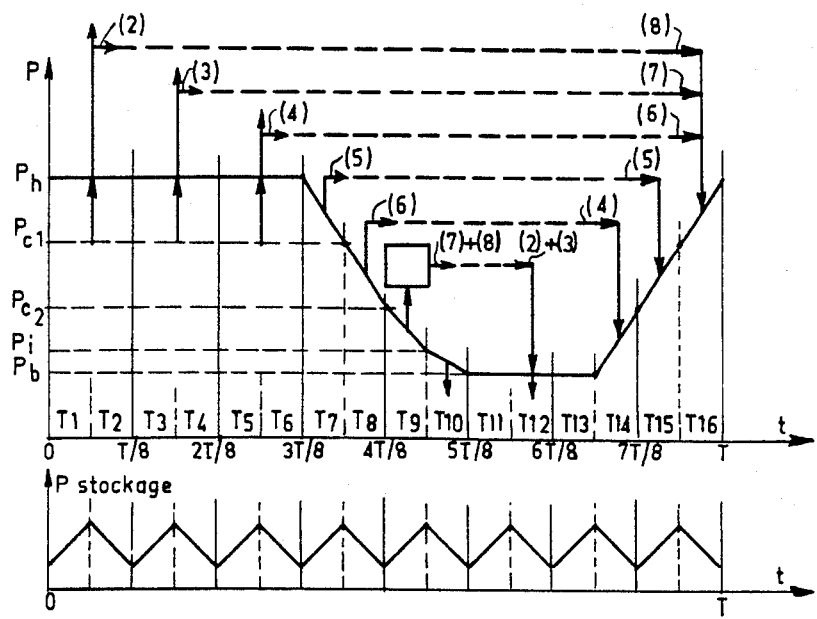

FIG. 4 illustrates a graph relating to eight adsorbers, still comprising a storage section and three adsorbers in production, and two balancing actions. The numbers of ing the different operating stages applicable to the different adsorbers, has been illustrated below at Table V.

TABLE V

|  | $T_1$ | $T_2$ | $T_3$ | $T_4$ | $T_5$ | $T_6$ | $T_7$ | $T_8$ | $T_9$ |
|---|---|---|---|---|---|---|---|---|---|
| Production | 891 | 891 | 912 | 912 | 123 | 123 | 234 | 234 | 345 |
| 1st decompression (balancing) | 7 |  | 8 |  | 9 |  | 1 |  | 2 |
| 2nd decompression (balancing) |  | 7 |  | 8 |  | 9 |  | 1 |  |
| 3rd decompression (balancing) | 6 |  | 7 |  | 8 |  | 9 |  | 1 |
| Into Storage |  | 6 |  | 7 |  | 8 |  | 9 |  |
| Final Decompression | 5 |  | 6 |  | 7 |  | 8 |  | 9 |
| Elution | 4 | 4 + 5 | 5 | 5 + 6 | 6 | 6 + 7 | 7 | 7 + 8 | 8 |
| 1st recompression | 3 |  | 4 |  | 5 |  | 6 |  | 7 |

TABLE V-continued

| (balancing) | | | | | |
|---|---|---|---|---|---|
| 2nd recompression (balancing) | | 3 | 4 | 5 | 6 |
| 3rd recompression (balancing) | 2 | 3 | 4 | 5 | 6 |
| Final Recompression | | 2 | 3 | 4 | 5 |

| | $T_{10}$ | $T_{11}$ | $T_{12}$ | $T_{13}$ | $T_{14}$ | $T_{15}$ | $T_{16}$ | $T_{17}$ | $T_{18}$ |
|---|---|---|---|---|---|---|---|---|---|
| Production | 345 | 456 | 456 | 567 | 567 | 678 | 678 | 789 | 789 |
| 1st decompression (balancing) | | 3 | | 4 | | 5 | | 6 | |
| 2nd decompression (balancing) | 2 | | 3 | | 4 | | 5 | | 6 |
| 3rd decompression (balancing) | | 2 | | 3 | | 4 | | 5 | |
| Into Storage | 1 | | 2 | | 3 | | 4 | | 5 |
| Final Decompression | | 1 | | 2 | | 3 | | 4 | |
| Elution | 8 + 9 | 9 | 9 + 1 | 1 | 1 + 2 | 2 | 2 + 3 | 3 | 3 + 4 |
| 1st recompression (balancing) | | 8 | | 9 | | 1 | | 2 | |
| 2nd recompression (balancing) | 7 | | 8 | | 9 | | 1 | | 2 |
| 3rd recompression (balancing) | | 7 | | 8 | | 9 | | 1 | |
| Final Recompression | 6 | | 7 | | 8 | | 9 | | 1 |

Figure 6:
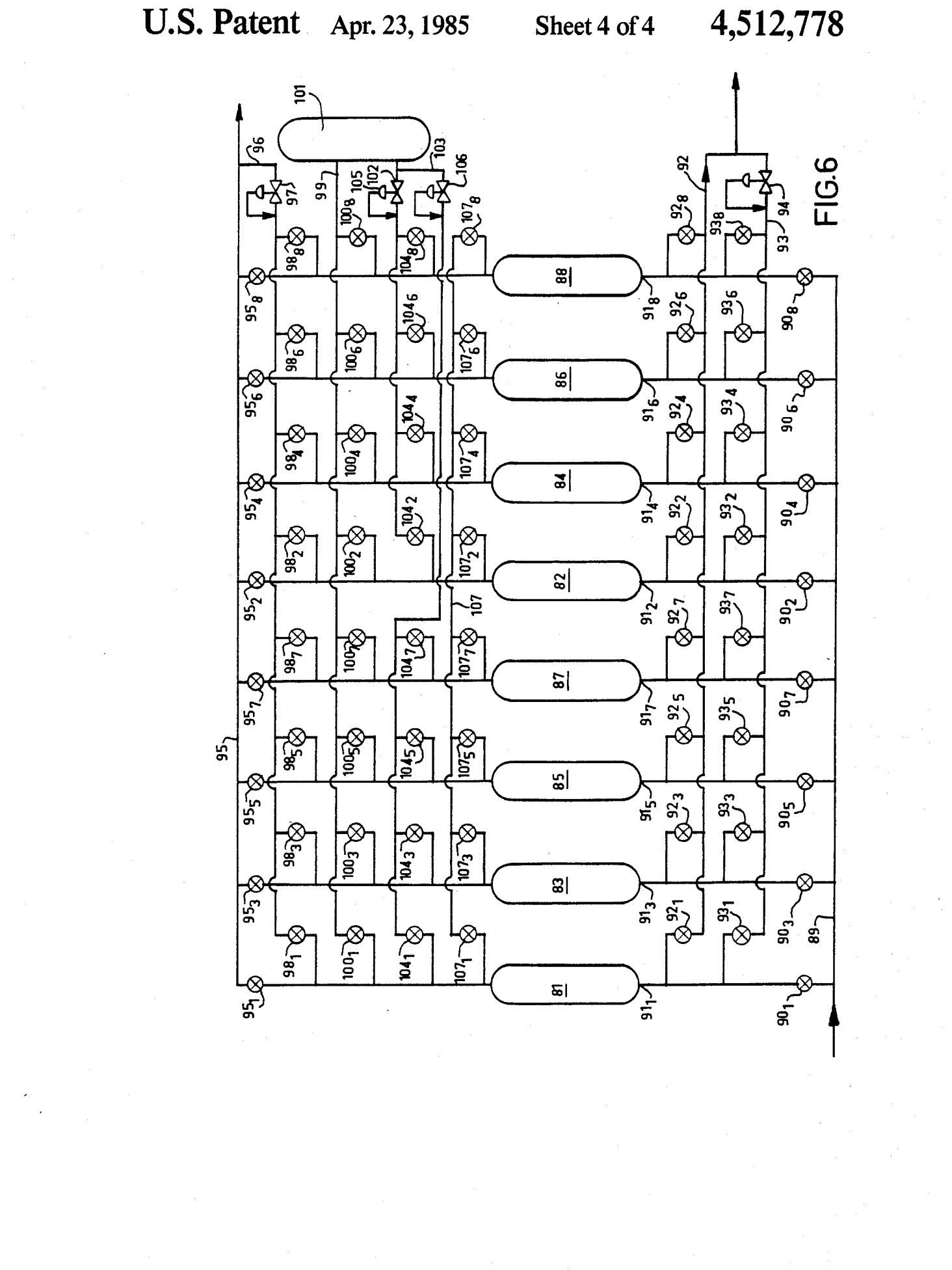

According to FIG. 6 which illustrates a mode of application of a process operating according to FIG. 4, eight adsorbers 81 to 88 are available, each adsorber 81 to 88 having allocated to it:

- a feed line 89 comprising valves $90_1$, $90_2$ ... $90_8$: the gas to be processed being allowed to enter at the inlets $91_1$ to $91_8$ of each adsorber during its isobaric production stage from $T_1$ to $T_6$, a discharge line 92 comprising discharge valves $92_1$ to $92_8$ for the elution stage from $T_{11}$ to $T_{13}$.
- a withdrawal line 95 comprising valves $95_1$ to $95_8$ for the production stage from $T_1$ to $T_6$, with a branch line 96 comprising a regulator 97 and valves $98_1$ to $98_8$ for the final recompression stage $T_{16}$,
- a feed line 99 for the storage tank 101 comprising valves $100_1$ to $100_8$ for the intermediate pressure decompression stage $T_9$,
- two derivation lines for withdrawal from the storage tank, 102 and 103 having a regulator 105 and 106, the one (103) comprising valves $104_1,104_3,104_5,104_7$, the other (102) comprising valves $104_2,104_4,104_6$ and $104_8$ for the elution stage $T_{11}$ to $T_{13}$,
- a balancing line 107 comprising valves $107_1$ to $107_8$ for the first decompression stage $T_7$, second decompression stage $T_8$, first recompression stage $T_{14}$ and second recompression stage $T_{15}$.

The invention relates to an adsorption process utilising a plurality of adsorbers, having the following operating stages: isobaric equidirectional production at so-called high pressure simultaneously on several adsorbers, at least one decompression in equidirectional flow by balancing with another adsorber in the course of recompression in contradirectional flow; decompression to intermediate pressure in equidirectional flow; final decompression to so-called low pressure in contradirectional flow; elution at the said low pressure in contradirectional flow; recompression in contradirectional flow by at least one balancing action; final recompression in contradirectional flow by drawing off a part of the production flow.

The present invention as has its object new developments of the process hereinbefore set forth, and is characterised in that the gas coming from the said decompression to intermediate pressure is fed into a buffer tank, whereas the elution gas is drawn from the said buffer tank, and in that each adsorber has an operating cycle time-lagged by 1/nth of a cycle period (T) with respect to a preceding one (n being the number of adsorbers), and in that each production stage has a duration of (x/n)T, (x being the number of adsorbers in simultaneous production), with "n" being greater than or equal to 6, and "x" greater than or equal to 2, and in that each stage of decompression to intermediate pressure has a shorter duration than each elution stage.

The ratio between the period of an elution stage and the period of an intermediate pressure decompression stage is equal to at least 1.5 for preference, and preferentially equal to 2 or 3. According to a mode of application, the number n of adsorbers if one of the numerals six and seven and comprises a single decompression with balancing action. According to another mode of application, the number n of adsorbers is one of the numerals seven, eight and nine and comprises two successive decompressions by balancing, firstly with an adsorber which had already undergone a first balancing action, and then with another adsorber at the end of an elution stage. According to another mode of application, the number n of adsorbers is nine and comprises three successive decompressions by balancing with three other adsorbers.

We claim:

1. In an adsorption process utilising a plurality of adsorbers with the following successive operating stages: isobaric production at so-called high pressure in equidirectional flow on several adsorbers at the same time, at least one decompression in equidirectional flow by balancing with another adsorber which is in the course of recompression in contradirectional flow, decompression to intermediate pressure in equidirectional flow, final decompression to so-called low pressure in contradirectional flow, elution at the said low pressure in contradirectional flow, recompression in contradirectional flow by at least one balancing action, final recompression in contradirectional flow by derivation of a part of the production flow, the improvement which consists in that the gas originating from the said decompression to intermediate pressure is fed into a buffer tank and the gas used for elution is drawn from the said buffer tank, and in that each adsorber has an operating cycle delayed by 1/nth of a cycle period (T) with respect to a preceding one (n being the number of adsorbers), and in that each production stage has a duration of (x/n)T (x being the number of adsorbers in simultaneous production), with "n" greater than or equal to 6, and "x" greater than or equal to 2, and in that the time period to decompress each adsorber to an intermediate pressure is less than the time period to elute each adsorber, and in that the gas drawn from the buffer tank for elution of an adsorber is supplied to that buffer tank by at least two different adsorbers.

2. An adsorption process according to claim 1, wherein the ratio between the period of an elution stage and the period of a stage of decompression to an intermediate pressure is equal to at least 1.5.

3. An adsorption process according to claim 2, wherein said ratio is 2.

4. An adsorption process according to claim 2, wherein said ratio is 3.

5. An adsorption process according to claim 1, wherein the number n of adsorbers is one of the numerals six and seven and comprises a single decompression with a balancing action.

6. An adsorption process according to claim 1, wherein the number n of adsorbers is one of the numerals seven, eight and nine, and comprises two successive decompressions performed firstly with an adsorber which had already been exposed to a first balancing action, and then with another adsorber at the end of an elution stage.

7. An adsorption process according to claim 1, wherein the number n of adsorbers is nine and comprises three successive decompressions by balancing with three other adsorbers.

* * * * *